(12) United States Patent
Ikeda et al.

(10) Patent No.: US 10,744,855 B2
(45) Date of Patent: Aug. 18, 2020

(54) COOLING DEVICE FOR VEHICLE

(71) Applicants: TOYOTA JIDOSHA KABUSHIKI KAISHA, Toyota-shi, Aichi-ken (JP); DENSO CORPORATION, Kariya, Aichi-pref. (JP)

(72) Inventors: Tetsuya Ikeda, Okazaki (JP); Kouji Norisada, Kariya (JP); Masahiro Noguchi, Kariya (JP); Masataka Minamigawa, Kariya (JP); Masashi Shibata, Kariya (JP); Junichi Suematsu, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 48 days.

(21) Appl. No.: 16/265,037

(22) Filed: Feb. 1, 2019

(65) Prior Publication Data
US 2019/0255914 A1 Aug. 22, 2019

(30) Foreign Application Priority Data
Feb. 19, 2018 (JP) .................................. 2018-026628

(51) Int. Cl.
*B60H 1/32* (2006.01)
*B60H 1/00* (2006.01)

(52) U.S. Cl.
CPC ....... *B60H 1/3205* (2013.01); *B60H 1/00328* (2013.01); *B60H 1/00464* (2013.01)

(58) Field of Classification Search
CPC .............. B60H 1/3205; B60H 1/00328; B60H 1/00464
See application file for complete search history.

(56) References Cited

U.S. PATENT DOCUMENTS

| 4,651,922 A * | 3/1987 | Noba ...................... F01P 7/026 123/41.12 |
| 4,658,595 A * | 4/1987 | Shimada ................ B60H 1/323 236/35 |

(Continued)

FOREIGN PATENT DOCUMENTS

| DE | 3816242 A1 * | 12/1988 | ......... F28D 1/05366 |
| EP | 1992508 A1 * | 11/2008 | ......... B60H 1/00828 |

(Continued)

OTHER PUBLICATIONS

DE 3816242 A1 mt (Year: 1988).*

*Primary Examiner* — Gordon A Jones
(74) *Attorney, Agent, or Firm* — Oliff PLC (57) ABSTRACT

A cooling device for a vehicle includes a mechanical fan configured to be driven by a driving force of the engine, an engine cooling heat exchanger disposed forward of the mechanical fan in a front-rear direction of the vehicle, a first heat exchanger and a second heat exchanger that are disposed forward of the engine cooling heat exchanger in the front-rear direction of the vehicle, a first electric fan that includes a first motor and cools the first heat exchanger, and a second electric fan that includes a second motor and cools the second heat exchanger. The first motor and the second motor are disposed forward of the first heat exchanger and the second heat exchanger, respectively, in the front-rear direction of the vehicle such that the first motor and the second motor do not overlap the coupling when viewed in a front direction of the vehicle.

3 Claims, 7 Drawing Sheets

(56) References Cited

U.S. PATENT DOCUMENTS

| | | | | |
|---|---|---|---|---|
| 7,918,193 | B2* | 4/2011 | Kojima | B60H 1/322 123/41.04 |
| 8,015,954 | B2* | 9/2011 | Kardos | B60K 11/04 123/41.12 |
| 8,118,087 | B2* | 2/2012 | Saida | B60H 1/00828 165/202 |
| 8,424,303 | B2* | 4/2013 | Kardos | F01P 7/165 123/41.31 |
| 2003/0089485 | A1* | 5/2003 | Blacquiere | B60H 1/00428 165/41 |
| 2016/0153695 | A1* | 6/2016 | Hamamoto | B60H 1/00921 62/140 |
| 2018/0017063 | A1* | 1/2018 | Morse | F04D 27/005 |

FOREIGN PATENT DOCUMENTS

| | | | | |
|---|---|---|---|---|
| GB | 2041850 A | * | 9/1980 | ............ F01P 11/12 |
| JP | H11-285106 A | | 10/1999 | |
| WO | WO-2007126372 A1 | * | 11/2007 | ............ B60K 11/04 |
| WO | WO-2017123131 A1 | * | 7/2017 | ......... F02B 29/0431 |

\* cited by examiner

COOLING DEVICE FOR VEHICLE

INCORPORATION BY REFERENCE

The disclosure of Japanese Patent Application No. 2018-026628 filed on Feb. 19, 2018 including the specification, drawings and abstract is incorporated herein by reference in its entirety.

BACKGROUND

1. Technical Field

The present disclosure relates to a cooling device for a vehicle and, more particularly, to a cooling device mounted on a hybrid vehicle.

2. Description of Related Art

A so-called hybrid vehicle that includes an engine and an electric motor and that travels by a driving force of one or both of the engine and the electric motor based on a predetermined driving condition is known from the related art.

In addition to a cooling circuit for cooling the engine, a cooling device mounted on the hybrid vehicle is provided with a cooling circuit for cooling an electric system in order to cope with heat generation of the electric motor, an inverter, or the like (electric system), in many cases.

For example, Japanese Unexamined Patent Application Publication No. 11-285106 (JP 11-285106 A) discloses a cooling device for a hybrid vehicle configured to cool a radiator for cooling an engine, a condenser of an air conditioner, and a radiator for cooling a motor by an electric fan driven and controlled based on an output of the motor and an operating state of the engine.

SUMMARY

Incidentally, in JP 11-285106 A, a heat exchanger (radiator, condenser, or the like) is configured to be cooled by the electric fan. However, it is considered to cool the heat exchanger by combining a mechanical (engine driven) fan and an electric fan from viewpoints of reduction of power consumption while an engine is driven, and suppression of increase in size of a battery and the like.

Specifically, it is considered to employ a configuration in which a mechanical fan that rotates by a driving force of an engine being transmitted via a coupling is provided at a front end portion of the engine disposed in an engine compartment of a vehicle front portion, and a heat exchanger is disposed forward of the mechanical fan. With the configuration, by driving the mechanical fan while the engine is driven, it is possible to cool the heat exchanger by introducing outside air from a front grill not only while the vehicle is traveling but also while the vehicle is stopped.

In view of the fact that a request for cooling performance of the engine is generally high, in the above configuration, it is desirable to dispose an engine cooling heat exchanger forward of the mechanical fan and make the engine cooling heat exchanger relatively large. However, when the engine cooling heat exchanger is made relatively large in a limited space inside the engine compartment, there is a problem that it is difficult to dispose a plurality of heat exchangers for cooling an electric system to be next to the engine cooling heat exchanger in a vertical direction or a right-left direction of the vehicle.

In addition, the electric fan has a motor at the center of the electric fan in many cases; however, depending on a disposed position of the electric fan with respect to the mechanical fan, since the rigid coupling on the mechanical fan side and the rigid motor on the electric fan side come into contact with each other at the time of a forward collision, a case where it is difficult to secure collision energy absorption stroke is also assumed.

The present disclosure provides a cooling device for a vehicle mounted on a hybrid vehicle, which realizes a system in which a mechanical fan and a plurality of electric fans are combined without a defect while satisfying requested cooling performance.

In the cooling device, an engine cooling heat exchanger is disposed to be next to a plurality of heat exchangers for cooling an electric system in a front-rear direction of the vehicle, and a plurality of electric fans is disposed forward of the heat exchangers for cooling the electric system in such a manner that a coupling on the mechanical fan side and a motor on the electric fan side do not interfere with each other at the time of a forward collision.

Specifically, an aspect of the present disclosure relates to a cooling device for a vehicle. The vehicle includes an engine disposed on a front portion of the vehicle and an electric motor configured to function as a generator and an electric motor. The vehicle is configured to travel by a driving force of one or both of the engine and the electric motor according to a predetermined driving condition. The cooling device is mounted on the vehicle.

The cooling device includes a mechanical fan, an engine cooling heat exchanger, a first heat exchanger, a second heat exchanger, a first electric fan, and a second electric fan. The mechanical fan is disposed at a front-side end portion of the engine in a front-rear direction of the vehicle and is configured to be driven by a driving force of the engine being transmitted via a coupling. The engine cooling heat exchanger is disposed forward of the mechanical fan in the front-rear direction of the vehicle. The first heat exchanger and the second heat exchanger are disposed forward of the engine cooling heat exchanger in the front-rear direction of the vehicle, are disposed to be next to each other in a vertical direction or a right-left direction of the vehicle, and are configured to cool a heating element other than the engine. The first electric fan includes a first motor and is configured to cool the first heat exchanger. The second electric fan includes a second motor and is configured to cool the second heat exchanger. The first motor and the second motor are disposed forward of the first heat exchanger and the second heat exchanger, respectively, in the front-rear direction of the vehicle such that the first motor and the second motor do not overlap the coupling when viewed in a front direction of the vehicle.

According to the aspect, the first heat exchanger and the second heat exchanger configured to cool the heating element other than the engine are disposed to be next to the engine cooling heat exchanger in the front-rear direction of the vehicle, in other words, the first heat exchanger and the second heat exchanger are not aligned with the engine cooling heat exchanger in the vertical direction or the right-left direction of the vehicle. Thus, it is possible to make the engine cooling heat exchanger, which is requested to have high cooling performance, relatively large without being limited by the dispositions of the first heat exchanger and the second heat exchanger.

Since the mechanical fan, the engine cooling heat exchanger, the first heat exchanger and the second heat exchanger, and the first electric fan and the second electric fan are disposed in this order from the rear side to the front side of the vehicle between the engine and the front grill, it is possible to cool the first heat exchanger, the second heat exchanger, and the engine cooling heat exchanger by outside air introduced from the front grill and pushed rearward by driving the mechanical fan while the engine is driven.

Meanwhile, it is possible to cool at least one of the first heat exchanger or the second heat exchanger by outside air introduced from the front grill and pushed rearward by driving at least one of the first electric fan or the second electric fan while the engine is stopped.

Further, since the first motor and the second motor are disposed forward of the first heat exchanger and the second heat exchanger in the front-rear direction of the vehicle such that the first motor and the second motor do not overlap the coupling when viewed in the front direction of the vehicle, it is possible to suppress interference between the rigid coupling on the mechanical fan side and the rigid motors on the first electric fan side and the second electric fan side at the time of the forward collision. As described above, since the first electric fan and the second electric fan can be retracted without retraction of the engine to the vehicle cabin side by suppressing the interference between the rigid coupling and the rigid motors, it is possible to secure collision energy absorption stroke.

As described above, according to the above aspect, it is possible to avoid a structural defect while satisfying the requested cooling performance, but the following control defect may occur depending on an object to be cooled by the first heat exchanger and the second heat exchanger.

That is, in a hybrid vehicle, since a target time is set such that heat generation of a heating element other than an engine can be suppressed only by an electric fan, and the engine (mechanical fan) is stopped within the target time, improvement in fuel consumption is achieved in many cases, or a plurality of electric fans provided in the hybrid vehicle can be controlled independently of each other in many cases. However, in the above configuration, while the engine is stopped, when the first electric fan is independently driven because only the first heat exchanger needs to be cooled, hot air heated by passing through the first heat exchanger and the engine cooling heat exchanger flows back, so that the heat exchange efficiency of the second heat exchanger may decrease. Similarly, when the second electric fan is independently driven because only the second heat exchanger needs to be cooled, the hot air that has passed through the second heat exchanger and the engine cooling heat exchanger flows back, so that the heat exchange efficiency of the first heat exchanger may decrease. Then, when such a decrease in the heat exchange efficiency occurs, it is needed to start the engine before the target time elapses depending on the object to be cooled by the first heat exchanger and the second heat exchanger, so that improvement in fuel consumption may not be achieved.

The cooling device according to the aspect of the present disclosure may further include an electronic control unit configured to independently control the first electric fan and the second electric fan. The electronic control unit may be configured to simultaneously drive the first electric fan and the second electric fan when the electronic control unit determines that at least one of the first heat exchanger and the second heat exchanger needs to be cooled in a state where the engine is stopped.

According to the above aspect, since the first electric fan and the second electric fan are simultaneously driven even in a case where only the first heat exchanger needs to be cooled, for example, even when the hot air that has passed through the first heat exchanger and the engine cooling heat exchanger tries to flow back, the hot air is pushed rearward by the second electric fan, so that it is possible to suppress a decrease in heat exchange efficiency of the second heat exchanger. Similarly, since the second electric fan and the first electric fan are simultaneously driven even in a case where only the second heat exchanger needs to be cooled, for example, the hot air that has passed through the second heat exchanger and the engine cooling heat exchanger is pushed rearward by the first electric fan, so that it is possible to suppress a decrease in heat exchange efficiency of the first heat exchanger. Accordingly, it is possible to achieve improvement in fuel consumption by stopping the engine until the target time elapses.

In the cooling device according to the aspect of the present disclosure, the first heat exchanger may be a radiator that cools an inverter of the electric motor. The second heat exchanger may be a condenser of an air conditioner. The electronic control unit may be configured to simultaneously drive the first electric fan and the second electric fan when the electronic control unit determines that the condenser needs to be cooled in a state where the engine is stopped. The electronic control unit may be configured to simultaneously drive the first electric fan and the second electric fan when the electronic control unit determines that the radiator needs to be cooled and the condenser needs to be cooled in a state where the engine is stopped.

Although the inverter does not need to be positively cooled, when the second electric fan is independently driven in a case where the condenser needs to be cooled, such as cooling the inside of the vehicle using the air conditioner, as described above, the heat exchange efficiency of the radiator for cooling the inverter decreases and a power generation amount by the inverter decreases, so that there is a case where it is difficult to drive the electric system including the air conditioner. In this regard, in the aspect of the present disclosure, since the first electric fan and the second electric fan are simultaneously driven even when only the condenser needs to be cooled, it is possible to maintain the temperature of the inverter at the predetermined temperature or lower to suppress the decrease in the power generation amount.

On the contrary, when the first electric fan is independently driven in a case where the inverter needs to be cooled, as described above, the heat exchange efficiency of the condenser decreases, but there is no inconvenience in a case where the inside of the vehicle does not need to be cooled, such as in the winter. In this regard, in the aspect of the present disclosure, in a case where the inverter needs to be cooled, for example, when determination is made that the condenser needs to be cooled, such as cooling the inside of the vehicle, since the first electric fan and the second electric fan are simultaneously driven, it is possible to suppress unnecessary power consumption.

Therefore, according to the aspect, it is possible to combine the mechanical fan and the electric fans without the structural or control defect while satisfying the cooling performance of the engine, which is generally requested to have high cooling performance.

As described above, according to the aspect of the present disclosure, it is possible to realize a system in which the mechanical fan and the electric fans are combined without the defect while satisfying the requested cooling performance.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment for carrying out the present disclosure will be described with reference to the drawings. In the drawings, an arrow Up indicates an upward direction, an arrow Fr indicates a front side of a vehicle (the front side in a front-rear direction of the vehicle), and an arrow Rh indicates a right side (the right side in a vehicle width direction).

Hybrid Vehicle

Figure 1:
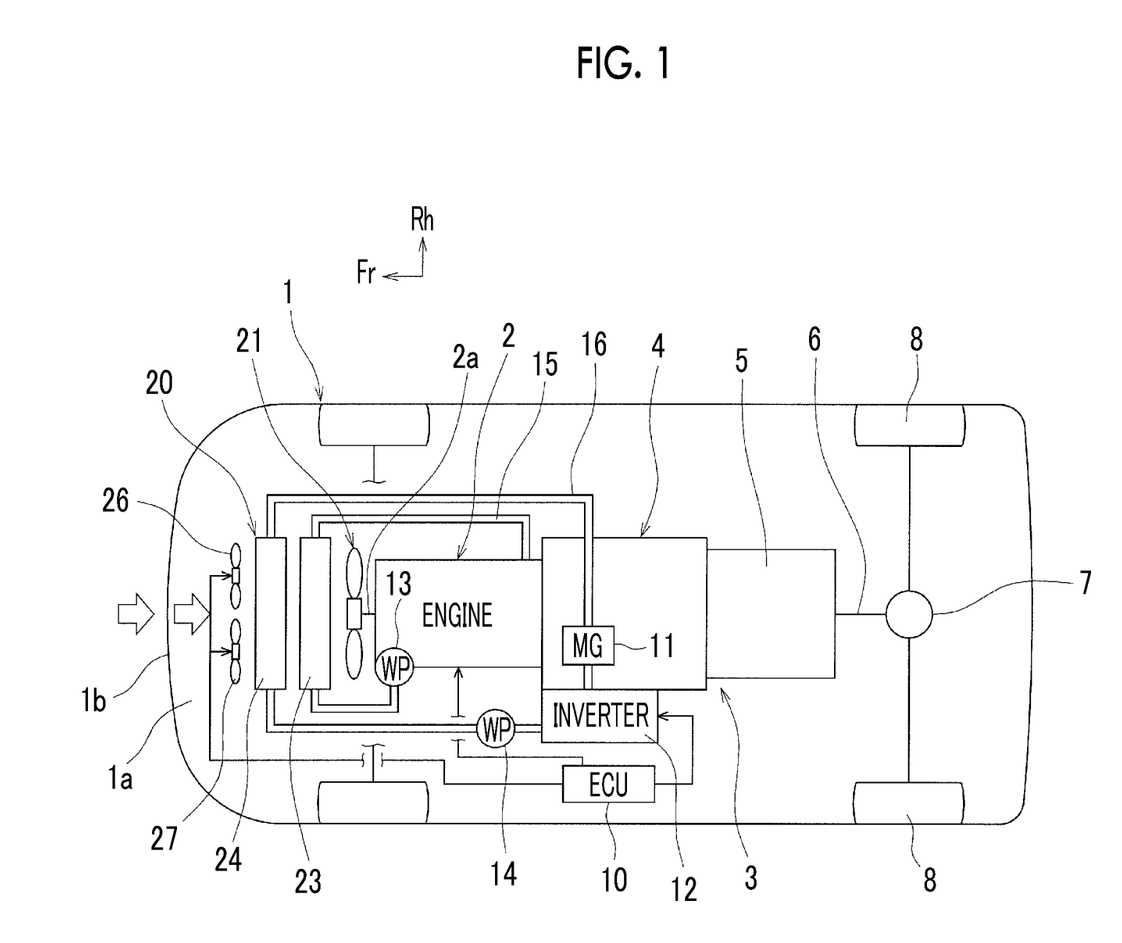
FIG. 1 is a diagram schematically showing a vehicle on which a cooling device for a vehicle according to an embodiment of the present disclosure is mounted.
Figure 2:
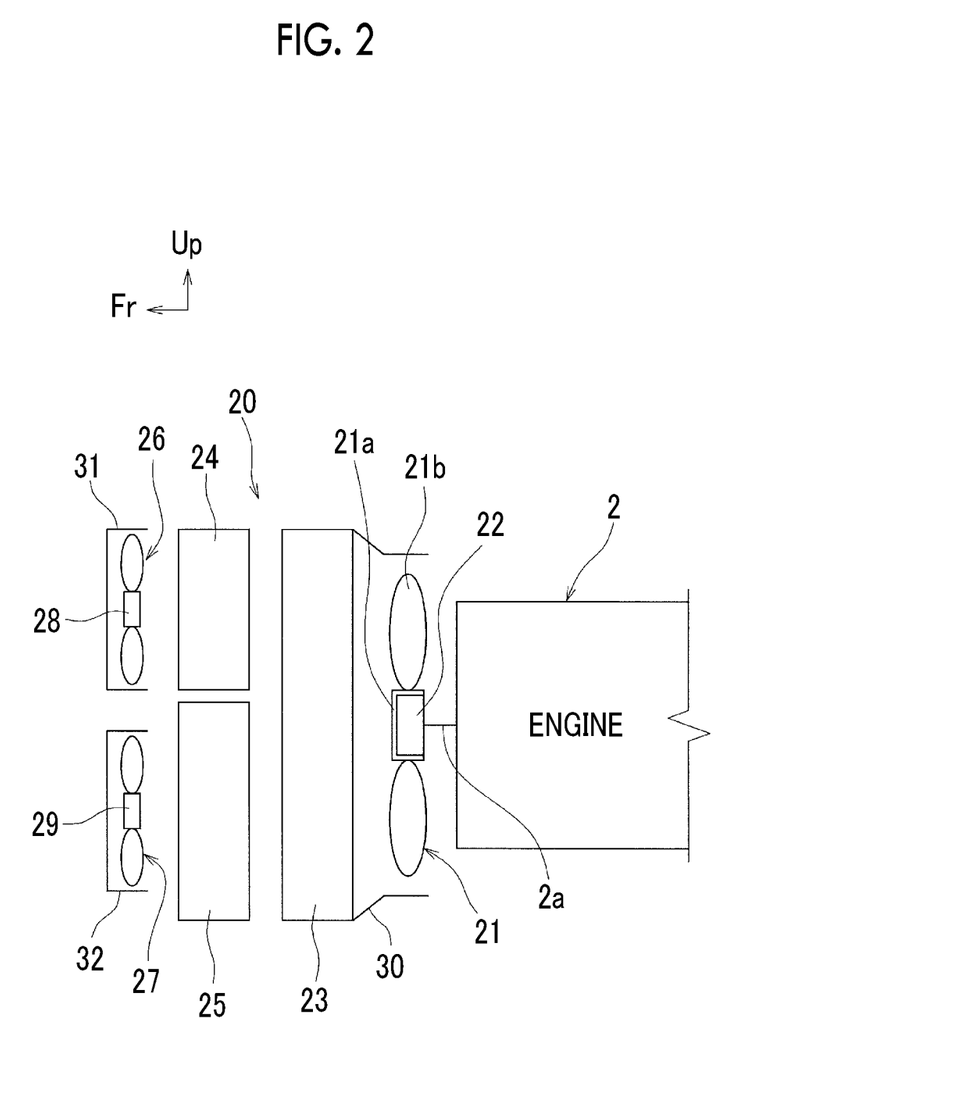
FIG. 2 is a side view schematically showing a main part of the cooling device as seen from the left side in a vehicle width direction.

FIG. 1 is a diagram schematically showing a vehicle 1 on which a cooling device 20 for a vehicle according to the embodiment is mounted, and FIG. 2 is a side view schematically showing a main part of the cooling device 20 as seen from a left side in the vehicle width direction. The vehicle 1 is a front-engine and rear-drive (FR) vehicle, and includes a longitudinally-positioned engine 2 disposed in an engine compartment of a vehicle front portion 1a such that a crankshaft 2a extends in the front-rear direction of the vehicle, a power transmission device 3 provided between the engine 2 and a pair of right and left drive wheels (rear wheels) 8, an air conditioner (not shown), an electronic control unit (ECU) 10, and the cooling device 20.

The power transmission device 3 includes an input shaft (not shown) to which a rotational driving force of the engine 2 is input, an electric differential portion 4 coupled to the input shaft, a transmission portion 5 coupled to the electric differential portion 4, and an output shaft 6 coupled to the transmission portion 5, and the rotational driving force of the engine 2 is transmitted to the differential gear device 7 via the input shaft, the electric differential portion 4, the transmission portion 5, and the output shaft 6, and then transmitted to the drive wheels 8.

The electric differential portion 4 includes a first electric motor and a second electric motor (shown simplified in one electric motor 11 in FIG. 1). For example, the first electric motor has a function as a generator that generates electric power using power of the engine 2 to charge a battery (not shown), and a function as a starter that rotates the crankshaft 2a to start the engine 2. Further, for example, the second electric motor has a function as a traveling drive source (motor) that applies driving forces to the drive wheels 8 via the transmission portion 5, and a function as a generator that generates electric power by regenerative braking to charge the battery. That is, the vehicle 1 of the embodiment includes the engine 2 and the electric motor 11 also functioning as a generator, and is configured as a so-called hybrid vehicle that travels by the driving force of one or both of the engine 2 and the electric motor 11 according to a predetermined driving condition.

Although not shown, the air conditioner includes an evaporator that cools passing air by forming a refrigeration cycle between a compressor, a condenser 25, and the like, a heater core that heats the passing air by circulating an engine coolant, and an air mix damper. In the air conditioner, the air that has passed through the evaporator is divided into air sent to the heater core and air bypassing the heater core according to an opening degree of the air mix damper, whereby a blowout temperature into a vehicle cabin (the temperature of the air blown into the vehicle cabin) is determined. The blowout temperature into the vehicle cabin is detected by a blowout temperature sensor (not shown).

The ECU 10 includes a central processing unit (CPU), an internal memory, and the like, and is configured to execute a predetermined calculation process based on information from each sensor and information stored in the memory, and control each device of the vehicle 1 based on a calculation result. In the vehicle 1, an engine ECU that controls the engine 2, a motor ECU that controls the electric motor 11, a hybrid vehicle electronic control unit (HV-ECU) that controls hybrid traveling, an air conditioning ECU that controls the air conditioner, and the like are mounted. However, in FIG. 1, in order to make the figure easy to see, the ECUs are simplified and displayed on one ECU 10.

For example, the ECU 10 is configured to execute engine control such as fuel injection control, ignition control, and intake air amount control based on an operating state of the engine 2 (engine ECU). The ECU 10 is configured to control an inverter 12 to convert direct current power from the battery side into alternating current power and apply the alternating current power to the electric motor 11, or convert alternating current power from the electric motor 11 into direct current power and supply the direct current power to the battery side, and is configured to maintain the temperature of an inverter coolant at a predetermined temperature or lower by driving a first electric fan 26 (to be described later) and increase a power generation amount (power generation efficiency) by the inverter 12 (motor ECU). Further, in a case where a state of charge (SOC) of the battery is sufficiently high, the ECU 10 is configured to select a motor travel mode when the vehicle speed is low and select a hybrid travel mode or an engine travel mode when the vehicle speed is high; however, in a case where the SOC is low, the ECU 10 is configured to select the hybrid travel mode or the engine travel mode (HV-ECU). In addition, at the time of cooling, the ECU 10 is configured to promote liquefaction of refrigerant compressed by the compressor to lower the temperature of the evaporator by driving a second electric fan 27 (to be described later) to cool the condenser 25 (air conditioning ECU).

Cooling Device

The cooling device 20 for a vehicle of the embodiment mounted on the hybrid vehicle 1 configured as described above has three cooling circuits: an engine cooling circuit 15; an inverter cooling circuit 16; and a condenser cooling circuit. Specifically, the cooling device 20 includes a mechanical fan 21, an engine cooling radiator 23, an inverter cooling radiator 24, the condenser 25, the first electric fan 26, and the second electric fan 27.

The mechanical fan 21 is provided at a front-side end portion of the engine 2 in the front-rear direction of the vehicle so as to rotate by the driving force of the engine 2 being transmitted via a coupling 22. The coupling 22 is well-known one, has an operating portion (not shown) as a metal case, a drive shaft (not shown) coupled to the crankshaft 2a of the engine 2, a plate (not shown) coupled to the drive shaft and rotatably held by the operating portion, and silicone oil interposed between the operating portion and the plate, and is configured such that a rotational force of the plate is transmitted to the operating portion via viscous resistance of the silicone oil. The mechanical fan 21 has a cylindrical boss portion 21a and a plurality of wing portions 21b projecting from an outer peripheral surface of the boss portion 21a, and is attached to the crankshaft 2a via the coupling 22 by attaching the boss portion 21a to the operating portion. With such a configuration, the mechanical fan 21 rotates as the engine 2 is driven, and blows outside air sucked from a front grill 1b rearward of the engine 2. As shown in FIG. 2, the mechanical fan 21 is covered over the entire circumference by a fan shroud 30, which is a cover for covering the engine cooling radiator 23, whereby rewinding of airflow from the tip of the wing portion 21b is suppressed.

As shown in FIGS. 1 and 2, the engine cooling radiator (engine cooling heat exchanger) 23 is disposed forward of the mechanical fan 21 in the front-rear direction of the vehicle and rearward of the inverter cooling radiator 24 and the condenser 25 in the front-rear direction of the vehicle. In the vehicle 1 of the embodiment, the inverter cooling radiator 24 and the condenser 25 are disposed to be next to the engine cooling radiator 23 in the front-rear direction of the vehicle, in other words, the inverter cooling radiator 24 and the condenser 25 are not aligned with the engine cooling radiator 23 in a vertical direction or the right-left direction of the vehicle. Thus, it is possible to make the engine cooling radiator 23, which is requested to have high cooling performance, relatively large even in the limited space inside the engine compartment.

The engine cooling radiator 23 constitutes the engine cooling circuit 15 together with a water pump 13 operated by a driving force of the engine 2, a reserve tank (not shown) for absorbing a volume change accompanying a temperature change of the engine coolant, and the like. In the engine cooling circuit 15, when the water pump 13 is operated by driving the engine 2, the engine coolant flows through into a water jacket (not shown) of the engine 2 to recover heat of the engine 2, and flows through into the engine cooling radiator 23 cooled by the mechanical fan 21 after gas-liquid separation is performed by passing through the reserve tank, whereby the heat recovered from the engine 2 is released to the atmosphere.

As shown in FIG. 2, the inverter cooling radiator (first heat exchanger) 24 is disposed above the condenser 25, forward of the engine cooling radiator 23 in the front-rear direction of the vehicle. In addition, the first electric fan 26 is disposed forward of the inverter cooling radiator 24 in the front-rear direction of the vehicle, and is driven based on a command from the ECU 10.

Figure 3:
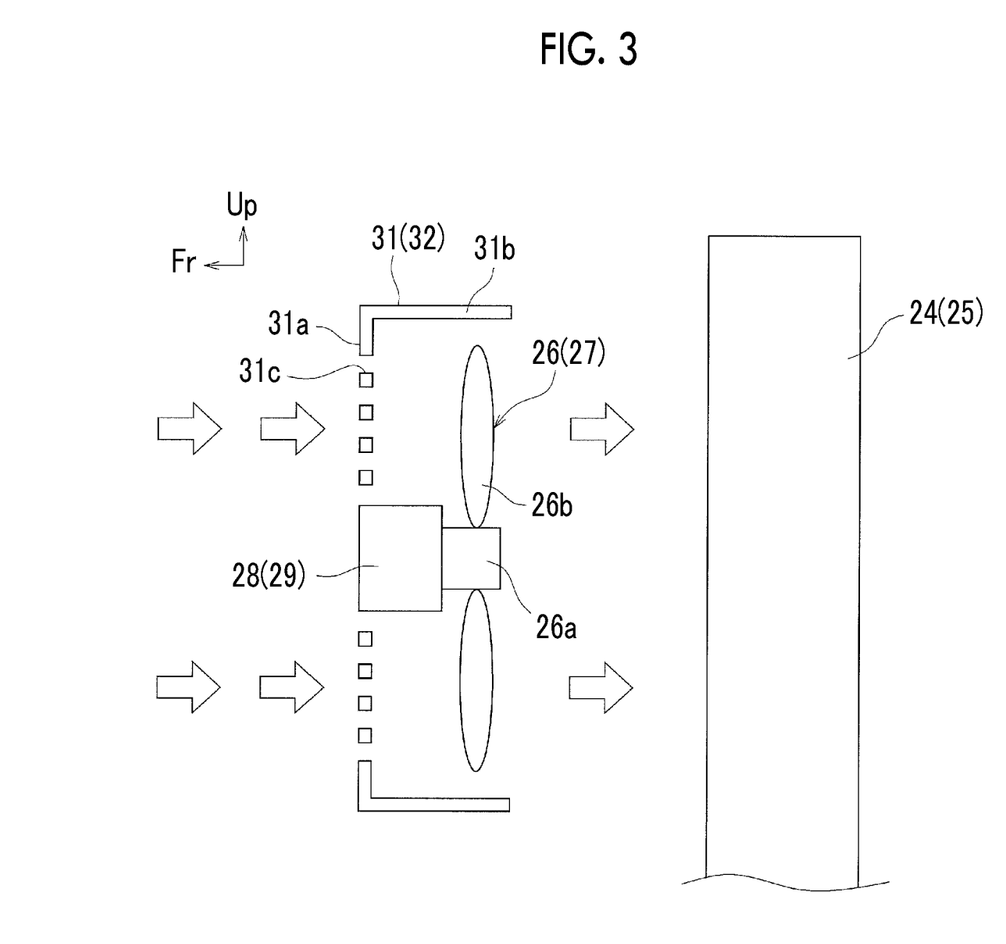
FIG. 3 is a diagram schematically showing a structure of an electric fan.

FIG. 3 is a diagram schematically showing the structure of the first electric fan 26 and the second electric fan 27. Since the first electric fan 26 and the second electric fan 27 have the same configuration, only the first electric fan 26 will be described below in order to avoid repetition of the description. The first electric fan 26 is disposed forward of the inverter cooling radiator 24 in the front-rear direction of the vehicle via a fan shroud 31 fixed by a fixing member (not shown). The fan shroud 31 has a disk-shaped main body portion 31a and a cylindrical cover portion 31b extending rearward from the outer peripheral edge portion of the main body portion 31a and covering over the entire circumference of the first electric fan 26. A plurality of vent holes 31c is formed in the main body portion 31a, and a motor 28 of the first electric fan 26 is attached to the central portion of the main body portion 31a. The first electric fan 26 has the motor 28, a columnar attaching portion 26a attached to the motor 28, and a plurality of wing portions 26b projecting from an outer peripheral surface of the attaching portion 26a. With such a configuration, when the first electric fan 26 is driven in accordance with the drive of the motor 28 based on the command from the ECU 10, the outside air introduced from the front grill 1b is pushed rearward through the vent hole 31c to cool the inverter cooling radiator 24.

The inverter cooling radiator 24 constitutes the inverter cooling circuit 16 together with an electric water pump 14, a reserve tank (not shown) for absorbing a volume change accompanying a temperature change of the inverter coolant, and the like. In the inverter cooling circuit 16, when the water pump 14 is operated, the inverter coolant recovers the heat of the inverter 12 or the electric motor 11, and flows through into the inverter cooling radiator 24 after passing through the reserve tank, whereby the heat recovered from the inverter 12 or the electric motor 11 is released to the atmosphere. While the engine is driven, the inverter cooling radiator 24 is cooled by the mechanical fan 21 (the mechanical fan 21 and the first electric fan 26 in a case where the amount of air is insufficient only with the mechanical fan 21), and while the engine is stopped, the inverter cooling radiator 24 is cooled by the first electric fan 26.

The temperature of the inverter coolant is detected by a temperature sensor (not shown). The ECU 10 is configured to maintain the temperature of the inverter coolant at a predetermined temperature or lower by driving the first electric fan 26 based on a detection result of the temperature sensor.

Meanwhile, as shown in FIG. 2, the condenser (second heat exchanger) 25 is disposed below the inverter cooling radiator 24, forward of the engine cooling radiator 23 in the front-rear direction of the vehicle. In addition, the second electric fan 27 is disposed forward of the condenser 25 in the front-rear direction of the vehicle via a fan shroud 32. With such a configuration, when the second electric fan 27 is driven in accordance with the drive of a motor 29 based on the command from the ECU 10, the outside air introduced from the front grill 1b is pushed rearward to cool the condenser 25, and the temperature of the evaporator in the air conditioner decreases.

In the condenser cooling circuit including the condenser 25, while the engine is driven, the condenser 25 is cooled by the mechanical fan 21 (the mechanical fan 21 and the second electric fan 27 in a case where the amount of air is insufficient only with the mechanical fan 21), and while the engine is stopped, the condenser 25 is cooled by the second electric fan 27. The ECU 10 is configured to be able to drive the second electric fan 27 independently of the drive of the first electric fan 26, and drives the second electric fan 27 based on the detection result of the blowout temperature sensor, the set temperature, or the like.

As described above, in the cooling device 20 of the embodiment, by disposing the inverter cooling radiator 24 and the condenser 25 to be next to the engine cooling radiator 23 in the front-rear direction of the vehicle, it is possible to make the engine cooling radiator 23, which is requested to have high cooling performance, relatively large. However, in the configuration, the first electric fan 26 and the second electric fan 27 are aligned with the mechanical fan 21 in the front-rear direction of the vehicle. Therefore, depending on disposed positions of the first electric fan 26 and the second electric fan 27 with respect to the mechanical fan 21, since the rigid coupling 22 on the mechanical fan 21 side and the rigid motors 28, 29 on the first electric fan 26 side and the second electric fan 27 side come into contact with each other at the time of a forward collision, a case where it is difficult to secure collision energy absorption stroke is also assumed. More specifically, at the time of the forward collision, it is desirable to deform the vehicle front portion 1a to absorb the collision energy, but when the rigid motors 28, 29 composed of a magnet and a coil come into contact with the rigid coupling 22 having a metal case when retracting in accordance with the deformation of the vehicle front portion 1a, the rigid motors 28, 29 and the rigid coupling 22 are not deformed, and the engine 2 may be retracted to the vehicle cabin side as the motors 28, 29 are retracted.

Figure 4:
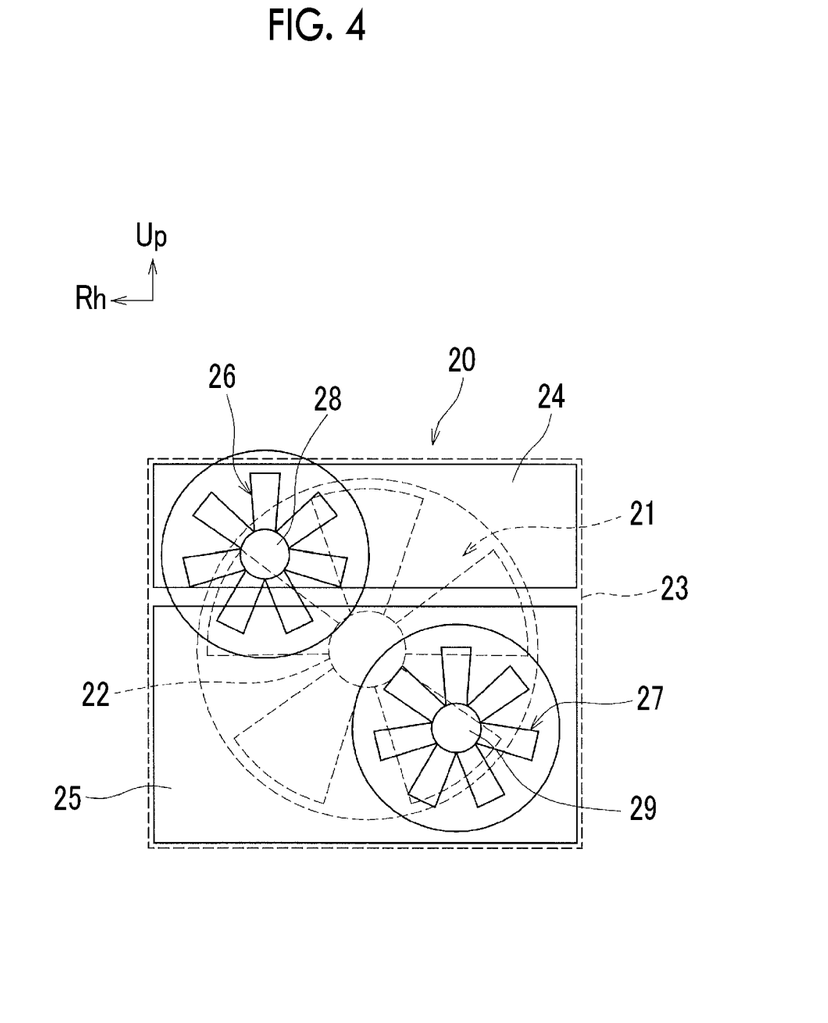
FIG. 4 is a front view schematically showing a main part of the cooling device.

Therefore, in the cooling device 20 of the embodiment, as shown in FIG. 4, the first electric fan 26 is disposed forward of the inverter cooling radiator 24 in the front-rear direction of the vehicle such that the motor 28 of the first electric fan 26 does not overlap the coupling 22 when viewed in the front direction of the vehicle, and the second electric fan 27 is disposed forward of the condenser 25 in the front-rear direction of the vehicle such that the motor 29 of the second electric fan 27 does not overlap the coupling 22 when viewed in the front direction of the vehicle.

By disposing the first electric fan 26 and the second electric fan 27 in the above described manner, the rigid coupling 22 on the mechanical fan 21 side and the rigid motors 28, 29 on the first electric fan 26 side and the second electric fan 27 side do not interfere with each other at the time of the forward collision. Therefore, without retraction of the engine 2 to the vehicle cabin side, the first electric fan 26 and the second electric fan 27 can be retracted in accordance with the deformation of the vehicle front portion 1a to absorb the collision energy.

With the cooling device 20 of the embodiment configured as described above, it is possible to avoid a structural defect while satisfying the requested cooling performance, but the following control defect may occur.

Figure 5:
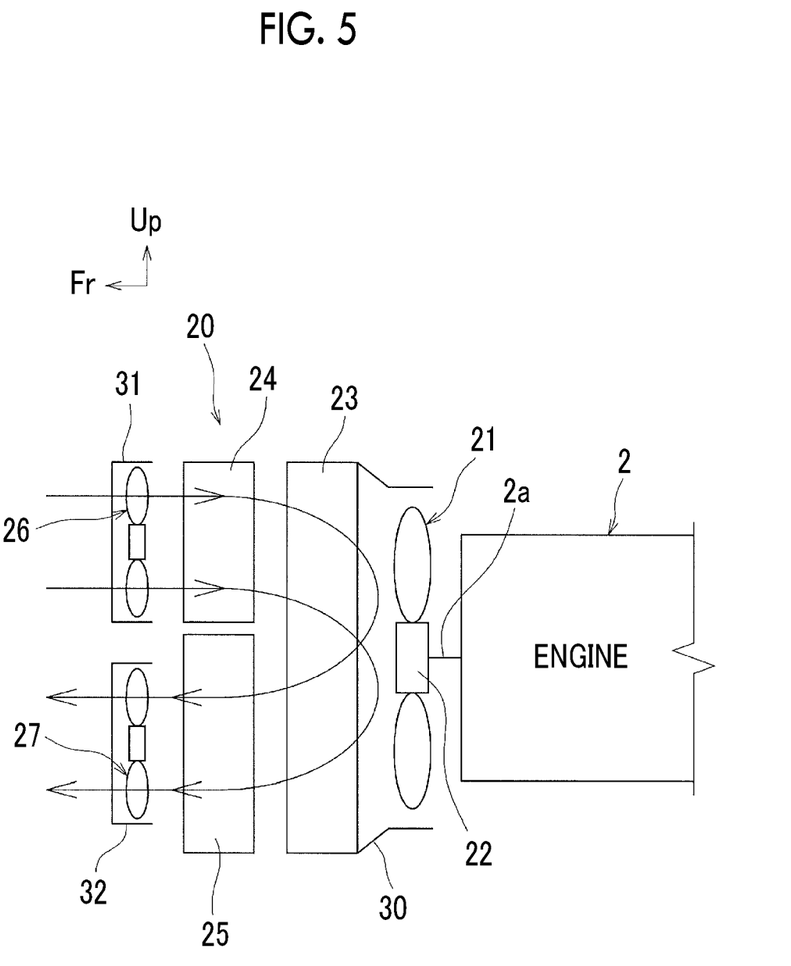
FIG. 5 is a side view schematically describing flow of air when a first electric fan is independently driven.

That is, in the hybrid vehicle 1, a condenser cooling efficiency maintenance time (for example, 120 seconds) capable of maintaining the condenser 25 at a predetermined temperature or lower is set even while the engine is stopped, and improvement in fuel consumption is achieved in many cases by stopping the engine 2 (mechanical fan 21) within the condenser cooling efficiency maintenance time. However, when the first electric fan 26 is independently driven as shown in FIG. 5 because only the inverter cooling radiator 24 needs to be cooled, the hot air heated by passing through the inverter cooling radiator 24 and the engine cooling radiator 23 flows back, so that the heat exchange efficiency of the condenser 25 may decrease. When the heat exchange efficiency decreases in this manner, since it is possible to maintain (cool) the condenser 25 at a predetermined temperature or lower only for about 30 seconds, the engine 2 has to be started before the condenser cooling efficiency maintenance time elapses, so that a situation may cause in which improvement in fuel consumption cannot be achieved. Such a situation may also occur when the second electric fan 27 is independently driven in a case where only the condenser 25 needs to be cooled.

Therefore, in the cooling device 20 of the embodiment, in a state where the engine 2 is stopped, the ECU 10 is configured to execute electric fan drive control that the first electric fan 26 and the second electric fan 27 are simultaneously driven when the ECU 10 determines that the condenser 25 needs to be cooled, and the first electric fan 26 and the second electric fan 27 are simultaneously driven when the ECU 10 determines that the inverter cooling radiator 24 needs to be cooled and the condenser 25 needs to be cooled.

More specifically, the ECU 10 determines whether or not the engine is stopped based on an input signal from an engine rotation speed sensor (not shown) that detects a rotation speed of the engine 2. When the ECU 10 determines that the engine is stopped, the ECU 10 determines whether or not the inverter 12 (inverter cooling radiator 24) needs to be cooled while the engine is stopped based on the temperature of the inverter coolant detected by a temperature sensor, and determines whether or not the condenser 25 needs to be cooled while the engine is stopped based on the blowout temperature detected by the blowout temperature sensor, the set temperature of the air conditioner, or the like.

The ECU 10 is configured to simultaneously or independently drive the first electric fan 26 and the second electric fan 27 according to the four cases that (1) both the inverter 12 and the condenser 25: no cooling needed, (2) the inverter 12: no cooling needed and the condenser 25: cooling needed, (3) both the inverter 12 and the condenser 25: cooling needed, (4) the inverter 12: cooling needed and the condenser 25: no cooling needed. In these cases, "no cooling needed" means a state in which it is possible to maintain the inverter coolant and the condenser 25 at each predetermined temperature or lower within the condenser cooling efficiency maintenance time even when the first electric fan 26 and the second electric fan 27 are positively driven.

For example, in a case where the temperature of the inverter coolant is sufficiently low and there is no need for cooling, such as in cold district and midwinter, that is, in a case of (1) both the inverter 12 and the condenser 25: no cooling needed, the ECU 10 naturally drives neither the first electric fan 26 nor the second electric fan 27.

Figure 6:
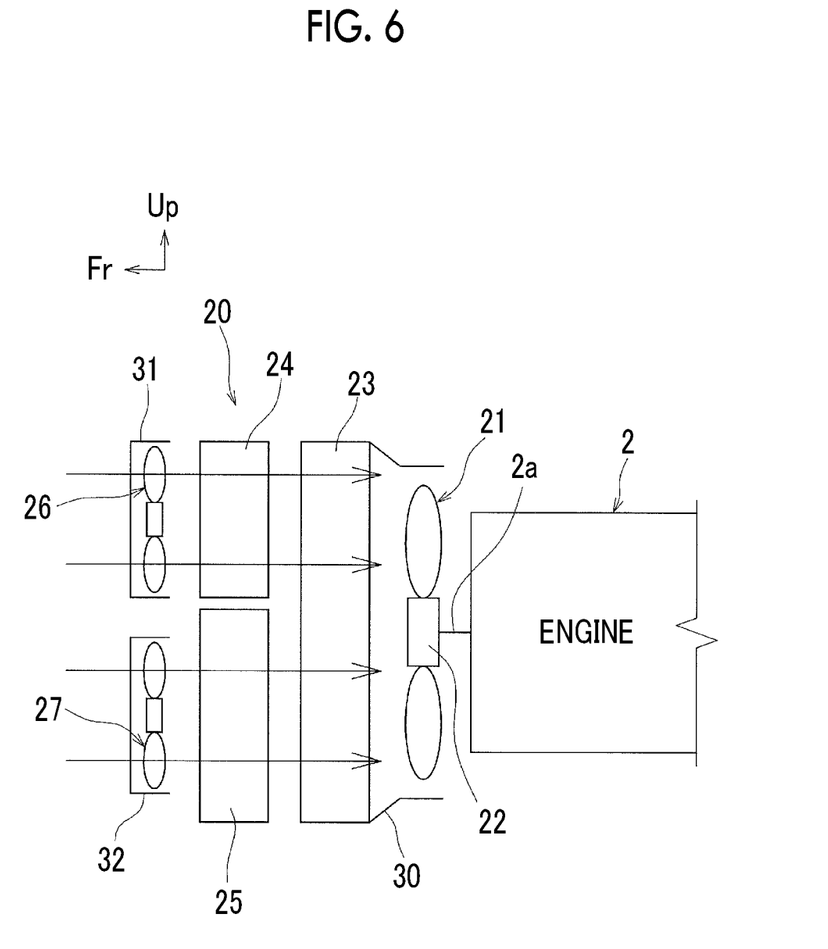
FIG. 6 is a side view schematically describing flow of air when the first electric fan and a second electric fan are simultaneously driven.

Although the inverter 12 does not need to be positively cooled, when the second electric fan 27 is independently driven in a case where the condenser 25 needs to be cooled, such as cooling the inside of the vehicle using the air conditioner, as described above, the heat exchange efficiency of the inverter cooling radiator 24 decreases and the power generation amount by the inverter 12 decreases, so that there is a case where it is difficult to drive electrical equipment including the air conditioner. In this regard, in the embodiment, by simultaneously driving the first electric fan 26 and the second electric fan 27 as shown in FIG. 6 even in a case of (2) the inverter 12: no cooling needed and the condenser 25: cooling needed, since the condenser 25 is cooled by the second electric fan 27 and the hot air is pushed rearward by the first electric fan 26 even when the hot air that has passed through the condenser 25 and the engine cooling radiator 23 tries to flow back, the decrease in the heat exchange efficiency of the inverter cooling radiator 24 can be suppressed.

Further, in a case where the inverter 12 needs to be cooled and the condenser 25 needs to be cooled, such as cooling the inside of the vehicle, in other words, in a case of (3) both the inverter 12 and the condenser 25: cooling needed, the ECU 10 naturally simultaneously drives the first electric fan 26 and the second electric fan 27.

On the contrary, when the first electric fan 26 is independently driven in a case where the inverter 12 needs to be cooled, as described above, the heat exchange efficiency of the condenser 25 decreases; however there is no inconvenience in a case where the inside of the vehicle does not need to be cooled, such as in the winter. Therefore, in the embodiment, in a case of (4) the inverter 12: cooling needed and the condenser 25: no cooling needed, the ECU 10 is configured to independently drive the first electric fan 26.

Accordingly, it is possible to suppress unnecessary power consumption generated by driving the second electric fan 27 which is not needed.

Depending on conditions, by simultaneously driving the first electric fan 26 and the second electric fan 27, it is confirmed that the condenser 25 can be maintained at a predetermined temperature or lower, for example, for 170 seconds even while the engine is stopped, in other words, the engine 2 can be stopped beyond the condenser cooling efficiency maintenance time.

Electric Fan Drive Control

Figure 7:
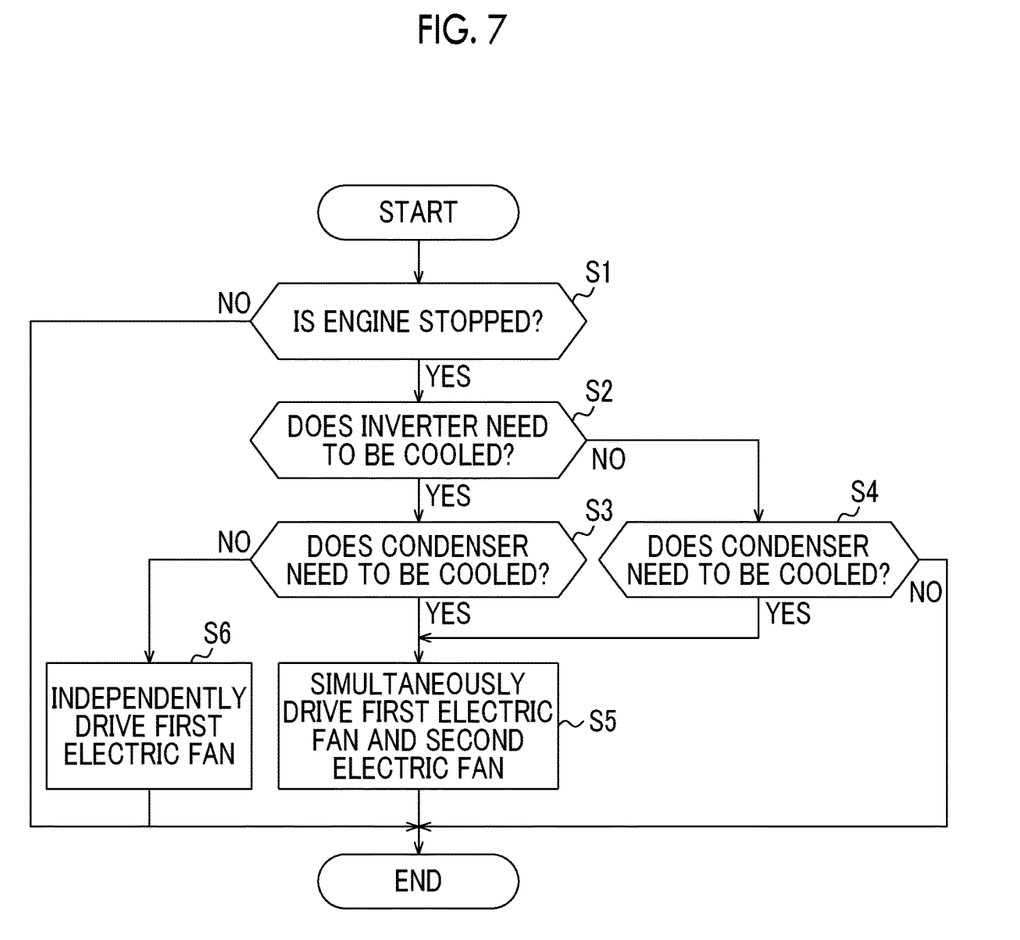
FIG. 7 is a flowchart showing an example of electric fan drive control.

Next, an example of the electric fan drive control executed by the ECU 10 will be described with reference to a flowchart shown in FIG. 7.

First, in step S1, the ECU 10 determines whether or not the engine is stopped. When the determination in step S1 is NO, that is, when the engine 2 is driven, since the mechanical fan 21 is driven, the process is ended as it is. When the engine 2 is driven, the ECU 10 performs normal control (assistance by the first electric fan 26 or the second electric fan 27 in a case where the amount of air is insufficient only with the mechanical fan 21); however, in this case, since the mechanical fan 21 is driven, hot air does not flow back even when the first electric fan 26 or the second electric fan 27 is independently driven.

Meanwhile, when the determination in step S1 is YES, that is, when the engine 2 is stopped, the process proceeds to step S2. Next, in step S2, the ECU 10 determines whether or not the inverter 12 (inverter cooling radiator 24) needs to be cooled while the engine is stopped. When the determination in step S2 is NO, that is, when the inverter 12 does not need to be cooled, the process proceeds to step S4.

Next, in step S4, the ECU 10 determines whether or not the condenser 25 needs to be cooled. When the determination in step S4 is NO, that is, when both the inverter 12 and the condenser 25 do not need to be cooled, the process is ended as it is, and the engine 2 is started, for example, after the condenser cooling efficiency maintenance time is elapsed.

Meanwhile, when the determination in step S4 is YES, that is, when the inverter 12 does not need to be cooled and the condenser 25 needs to be cooled, the process proceeds to step S5, the ECU 10 simultaneously drives the first electric fan 26 and the second electric fan 27, and then the process is ended. Accordingly, since the condenser 25 is cooled by the second electric fan 27 and the hot air is pushed rearward by the first electric fan 26 even when the hot air that has passed through the condenser 25 and the engine cooling radiator 23 tries to flow back, the decrease in the heat exchange efficiency of the inverter cooling radiator 24 can be suppressed.

On the contrary, when the determination in step S2 is YES, that is, when the inverter 12 needs to be cooled, the process proceeds to step S3. Next, in step S3, the ECU 10 determines whether or not the condenser 25 needs to be cooled. When the determination in step S3 is YES, that is, when both the inverter 12 and the condenser 25 need to be cooled, the process proceeds to step S5, the ECU 10 simultaneously drives the first electric fan 26 and the second electric fan 27, and then the process is ended.

Meanwhile, when the determination in step S3 is NO, that is, when the inverter 12 needs to be cooled and the condenser 25 does not need to be cooled, the process proceeds to step S6, the ECU 10 drives independently the first electric fan 26, and then the process is ended.

As described above, with the cooling device 20 for a vehicle of the embodiment, it is possible to combine the mechanical fan 21 and the electric fans 26, 27 without the structural or control defect while satisfying the cooling performance of the engine 2, which is generally requested to have high cooling performance in the hybrid vehicle 1.

OTHER EMBODIMENTS

An applicable embodiment of the present disclosure is not limited to the embodiment and can be implemented in various other forms without departing from the spirit or main characteristics thereof.

In the above-described embodiment, the inverter cooling radiator 24 and the condenser 25 are disposed to be next to each other in the vertical direction; however, an applicable embodiment of the present disclosure is not limited thereto, and the inverter cooling radiator 24 and the condenser 25 may be disposed to be next to each other in the right-left direction of the vehicle.

In addition, in the above-described embodiment, the mechanical fan 21 is attached to the crankshaft 2*a*; however, an applicable embodiment of the present disclosure is not limited thereto as long as the mechanical fan 21 rotates by the driving force of the engine 2 being transmitted via the coupling 22. The mechanical fan 21 may be attached to another auxiliary machine (for example, a water pump pulley or the like) via the coupling 22.

Thus, the above-described embodiments are merely illustrative in all respects, and should not be construed as limiting. Furthermore, all variations and modifications falling within the equivalent scope of the claims are within the scope of the present disclosure.

According to the embodiments of the present disclosure, since it is possible to realize a system in which a mechanical fan and a plurality of electric fans are combined without a defect while satisfying requested cooling performance, it is very useful when applied to a cooling device for a vehicle mounted on a hybrid vehicle.

What is claimed is:

1. A cooling device for a vehicle including an engine disposed on a front portion of the vehicle and an electric motor configured to function as a generator and an electric motor, the vehicle being configured to travel by a driving force of one or both of the engine and the electric motor according to a predetermined driving condition, the cooling device being mounted on the vehicle, the cooling device comprising:

a mechanical fan disposed at a front-side end portion of the engine in a front-rear direction of the vehicle and configured to be driven by a driving force of the engine being transmitted via a coupling;

an engine cooling heat exchanger disposed forward of the mechanical fan in the front-rear direction of the vehicle;

a first heat exchanger and a second heat exchanger that are disposed forward of the engine cooling heat exchanger in the front-rear direction of the vehicle, are disposed to be next to each other in a vertical direction or a right-left direction of the vehicle, and are configured to cool a heating element other than the engine;

a first electric fan including a first motor, the first electric fan being configured to cool the first heat exchanger; and a second electric fan including a second motor, the second electric fan being configured to cool the second heat exchanger, wherein the first motor and the second motor are disposed forward of the first heat exchanger and the second heat exchanger, respectively, in the front-rear direction of the vehicle such that the first motor and the second motor do not overlap the coupling when viewed in a front direction of the vehicle.

2. The cooling device according to claim 1, further comprising an electronic control unit configured to independently control the first electric fan and the second electric fan, wherein the electronic control unit is configured to simultaneously drive the first electric fan and the second electric fan when the electronic control unit determines that at least one of the first heat exchanger and the second heat exchanger needs to be cooled in a state where the engine is stopped.

3. The cooling device according to claim 2, wherein:

the first heat exchanger is a radiator that cools an inverter of the electric motor;

the second heat exchanger is a condenser of an air conditioner;

the electronic control unit is configured to simultaneously drive the first electric fan and the second electric fan when the electronic control unit determines that the condenser needs to be cooled in a state where the engine is stopped; and the electronic control unit is configured to simultaneously drive the first electric fan and the second electric fan when the electronic control unit determines that the radiator needs to be cooled and the condenser needs to be cooled in a state where the engine is stopped.

* * * * *